United States Patent
Lee et al.

(10) Patent No.: US 10,152,219 B2
(45) Date of Patent: Dec. 11, 2018

(54) WATCH-TYPE MOBILE TERMINAL

(71) Applicant: LG ELECTRONICS INC., Seoul (KR)

(72) Inventors: Yongdeok Lee, Seoul (KR); Minjoo Kim, Seoul (KR); Jihye Min, Seoul (KR); Hyekyoung Bu, Seoul (KR); Kwonhan Bae, Seoul (KR); Yeehyun Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/564,186

(22) PCT Filed: Jun. 3, 2015

(86) PCT No.: PCT/KR2015/005593
§ 371 (c)(1),
(2) Date: Oct. 3, 2017

(87) PCT Pub. No.: WO2016/163591
PCT Pub. Date: Oct. 13, 2016

(65) Prior Publication Data
US 2018/0129394 A1 May 10, 2018

(30) Foreign Application Priority Data

Apr. 7, 2015 (KR) .................. 10-2015-0048815

(51) Int. Cl.
*H04W 88/06* (2009.01)
*G06F 3/0488* (2013.01)
(Continued)

(52) U.S. Cl.
CPC ............ *G06F 3/0488* (2013.01); *G04G 21/00* (2013.01); *G06F 1/163* (2013.01); *G06F 3/0487* (2013.01);
(Continued)

(58) Field of Classification Search
CPC ............ H04L 12/4015; H04M 1/7253; H04M 2203/6018; H04W 8/005
(Continued)

(56) References Cited

U.S. PATENT DOCUMENTS

2009/0034591 A1* 2/2009 Julian .................... H04W 4/21
375/220
2014/0181183 A1* 6/2014 Houjou ............... H04M 1/7253
709/203

FOREIGN PATENT DOCUMENTS

JP 2011061511 3/2011
KR 10-2009-0049153 5/2009
(Continued)

OTHER PUBLICATIONS

PCT International Application No. PCT/KR2015/005593, International Search Report dated Jan. 7, 2016, 2 pages.

*Primary Examiner* — Sam Bhattacharya
(74) *Attorney, Agent, or Firm* — Lee, Hong, Degerman, Kang & Waimey PC

(57) ABSTRACT

A watch-type mobile terminal may include a display unit; and a controller coupled to the display unit, wherein the controller is configured: in response to the watch-type mobile terminal being paired with a further watch-type mobile terminal, to control the display unit to display an emotional message composition screen thereon; to control the watch-type mobile terminal to receive a message via touch input; to control the display unit to display the received message on the emotional message composition screen; and to control the watch-type mobile terminal to transmit the message to the further watch-type mobile terminal.

12 Claims, 13 Drawing Sheets

(51) Int. Cl.
  *H04M 1/725* (2006.01)
  *H04W 4/70* (2018.01)
  *H04W 4/80* (2018.01)
  *G04G 21/00* (2010.01)
  *H04W 4/02* (2018.01)
  *H04W 4/12* (2009.01)
  *G06F 1/16* (2006.01)
  *G06F 3/0487* (2013.01)

(52) U.S. Cl.
  CPC ............. *H04M 1/725* (2013.01); *H04W 4/02* (2013.01); *H04W 4/12* (2013.01); *H04W 4/70* (2018.02); *H04W 4/80* (2018.02); *H04W 88/06* (2013.01); *G06F 3/04883* (2013.01)

(58) Field of Classification Search
  USPC ................. 455/41.2, 466; 370/276, 312, 507
  See application file for complete search history.

(56) References Cited

FOREIGN PATENT DOCUMENTS

| | | |
|---|---|---|
| KR | 10-2010-0035672 | 4/2010 |
| KR | 10-2010-0130478 | 12/2010 |
| KR | 10-2011-0027475 | 3/2011 |

* cited by examiner (a)

(b)

(a)

(b)

WATCH-TYPE MOBILE TERMINAL

CROSS-REFERENCE TO RELATED APPLICATIONS

This application is the National Stage filing under 35 U.S.C. 371 of International Application No. PCT/KR2015/005593, filed on Jun. 3, 2015, which claims the benefit of earlier filing date and right of priority to Korean Application No. 10-2015-0048815, filed on Apr. 7, 2015, the contents of which are all hereby incorporated by reference herein in their entirety.

FIELD

The present disclosure relates to a watch-type mobile terminal.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

A mobile terminal may be used in a state of being grasped by a user's hand and may be used as a wearable device worn on a user's body. Examples of such a wearable device include a watch-type mobile terminal, a glasses-type mobile terminal, a head mounted display (HMD), etc.

The watch-type mobile terminal is obtained by adding an electronic function, a communication function, a multimedia function, etc. to a watch worn on a wrist of a person and is expected to form an explosively growing market because people are not hostile thereto.

Therefore, research into development and commercialization of a watch-type mobile terminal is underway.

SUMMARY

It is an object of the present disclosure to provide two watch-type mobile terminals that allow two users respectively corresponding to the two watch-type mobile terminals to feel that they are facing each other when a message is communicated between the watch-type mobile terminals.

In one aspect, there is provided a watch-type mobile terminal comprising: a display unit; and a controller coupled to the display unit, wherein the watch-type mobile terminal communicates with a further watch-type mobile terminal, wherein the controller is configured: in response to the watch-type mobile terminal being paired with the further watch-type mobile terminal, to control the display unit to display an emotional message composition screen thereon; to control the watch-type mobile terminal to receive a message via touch input; to control the display unit to display the received message on the emotional message composition screen; and to control the watch-type mobile terminal to transmit the message to the further watch-type mobile terminal.

In one aspect, there is provided a watch-type mobile terminal comprising: a display unit; and a controller coupled to the display unit, wherein the watch-type mobile terminal communicates with a further watch-type mobile terminal, wherein the controller is configured: in response to the watch-type mobile terminal being paired with the further watch-type mobile terminal, to control the display unit to display an emotional message receiving screen thereon; to control the watch-type mobile terminal to receive a message from the further watch-type mobile terminal; and to control the display unit to display the received message on the emotional message receiving screen.

In accordance with the present disclosure, two users respectively corresponding to the two watch-type mobile terminals may feel that they are facing each other when the message is communicated between the two watch-type mobile terminals.

DETAILED DESCRIPTIONS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
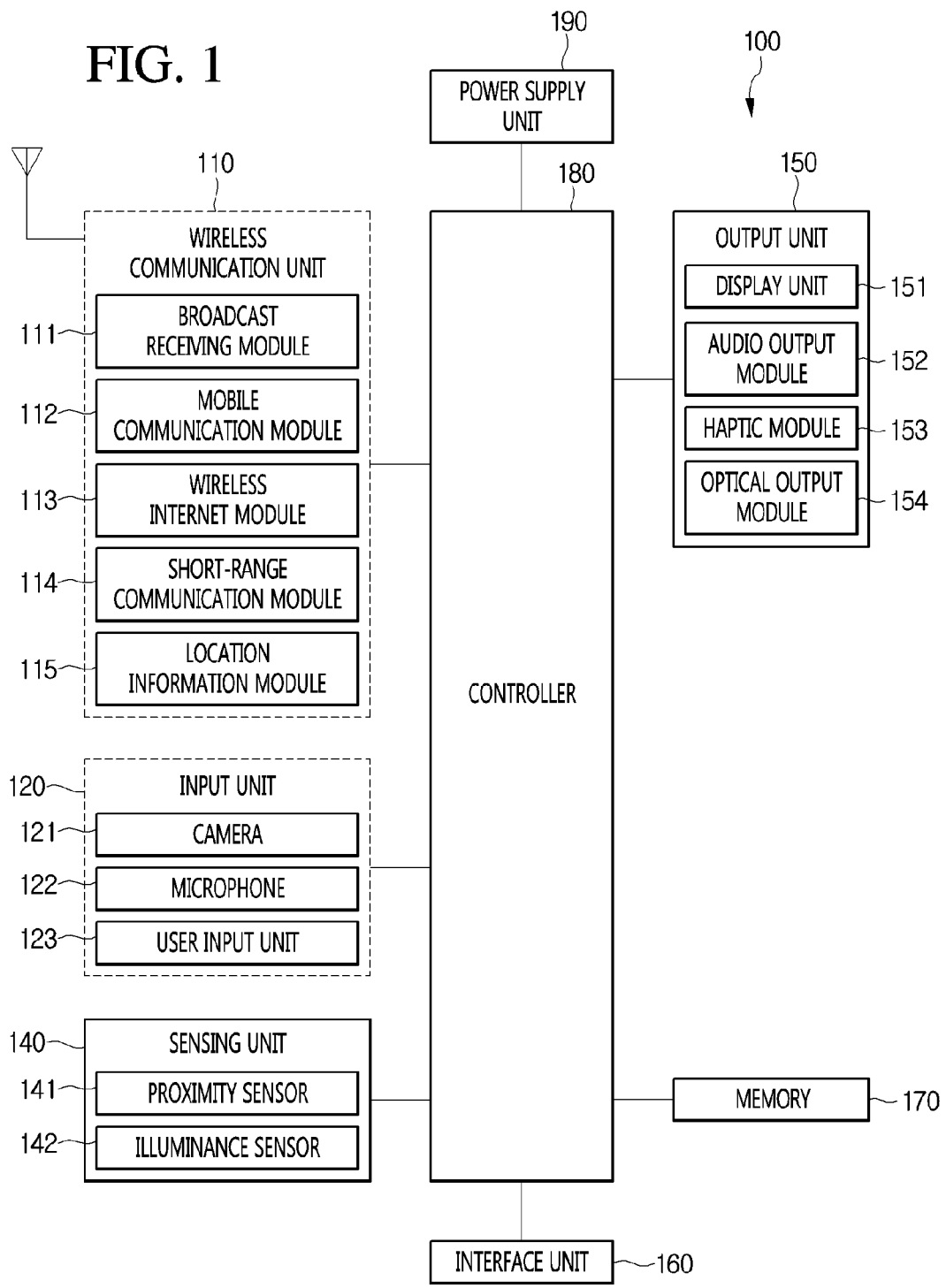
FIG. 1 is a block diagram of a watch-type mobile terminal in accordance with the present disclosure.

FIG. 1 is a block diagram of a watch-type mobile terminal in accordance with the present disclosure.

The watch-type mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The watch-type mobile terminal 100 is shown having wireless communication unit 110 configured with several commonly implemented components. For instance, the wireless communication unit 110 typically includes one or more components which permit wireless communication between the watch-type mobile terminal 100 and a wireless communication system or network within which the watch-type mobile terminal is located.

The wireless communication unit 110 typically includes one or more modules which permit communications such as wireless communications between the watch-type mobile terminal 100 and a wireless communication system, communications between the watch-type mobile terminal 100 and another mobile terminal, communications between the watch-type mobile terminal 100 and an external server. Further, the wireless communication unit 110 typically includes one or more modules which connect the watch-type mobile terminal 100 to one or more networks. To facilitate such communications, the wireless communication unit 110 includes one or more of a broadcast receiving module in, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the watch-type mobile terminal, the surrounding environment of the watch-type mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The watch-type mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the watch-type mobile terminal 100 and a user, as well as function as the user input unit 123 which provides an input interface between the watch-type mobile terminal 100 and the user.

The interface unit 160 serves as an interface with various types of external devices that can be coupled to the watch-type mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the watch-type mobile terminal 100 may perform assorted control functions associated with a connected external device, in response to the external device being connected to the interface unit 160.

The memory 170 is typically implemented to store data to support various functions or features of the watch-type mobile terminal 100. For instance, the memory 170 may be configured to store application programs executed in the watch-type mobile terminal 100, data or instructions for operations of the watch-type mobile terminal 100, and the like. Some of these application programs may be downloaded from an external server via wireless communication. Other application programs may be installed within the watch-type mobile terminal 100 at time of manufacturing or shipping, which is typically the case for basic functions of the watch-type mobile terminal 100 (for example, receiving a call, placing a call, receiving a message, sending a message, and the like). It is common for application programs to be stored in the memory 170, installed in the watch-type mobile terminal 100, and executed by the controller 180 to perform an operation (or function) for the watch-type mobile terminal 100.

The controller 180 typically functions to control overall operation of the watch-type mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170.

As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the watch-type mobile terminal 100. The power supply unit 190 may include a battery, and the battery may be configured to be embedded in the terminal body, or configured to be detachable from the terminal body.

Various components depicted in this figure will now be described in more detail. Regarding the wireless communication unit no, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the watch-type mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112. The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the watch-type mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the watch-type mobile terminal 100 and a wireless communication system, communications between the watch-type mobile terminal 100 and another mobile terminal, or communications between the watch-type mobile terminal and a network where another mobile terminal (or an external server) is located, via wireless area networks. One example of the wireless area networks is a wireless personal area networks.

In some embodiments, another mobile terminal (which may be configured similarly to watch-type mobile terminal 100) may be a wearable device, for example, a smart watch, a smart glass or a head mounted display (HMD), which is able to exchange data with the watch-type mobile terminal 100 (or otherwise cooperate with the watch-type mobile terminal 100). The short-range communication module 114 may sense or recognize the wearable device, and permit communication between the wearable device and the watch-type mobile terminal 100. In addition, when the sensed wearable device is a device which is authenticated to communicate with the watch-type mobile terminal 100, the controller 180, for example, may cause transmission of data processed in the watch-type mobile terminal 100 to the wearable device via the short-range communication module 114. Hence, a user of the wearable device may use the data processed in the watch-type mobile terminal 100 on the wearable device. For example, when a call is received in the watch-type mobile terminal 100, the user may answer the call using the wearable device. Also, when a message is received in the watch-type mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit no to obtain data related to the position of the mobile terminal.

As one example, when the watch-type mobile terminal uses a GPS module, a position of the watch-type mobile terminal may be acquired using a signal sent from a GPS satellite. As another example, when the watch-type mobile terminal uses the Wi-Fi module, a position of the watch-type mobile terminal can be acquired based on information related to a wireless access point (AP) which transmits or receives a wireless signal to or from the Wi-Fi module.

The input unit 120 may be configured to permit various types of input to the watch-type mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the watch-type mobile terminal 100. As another example, the cameras 121 may be located in a stereoscopic arrangement to acquire left and right images for implementing a stereoscopic image.

The microphone 122 is generally implemented to permit audio input to the watch-type mobile terminal 100. The audio input can be processed in various manners according to a function being executed in the watch-type mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the watch-type mobile terminal 100. The user input unit 123 may include one or more of a mechanical input element (for example, a key, a button located on a front and/or rear surface or a side surface of the watch-type mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the watch-type mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the watch-type mobile terminal, surrounding environment information of the watch-type mobile terminal, user information, or the like. The controller 180 generally cooperates with the sending unit 140 to control operation of the watch-type mobile terminal 100 or execute data processing, a function or an operation associated with an application program installed in the watch-type mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the watch-type mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the watch-type mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the watch-type mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the watch-type mobile terminal 100. For example, the display unit 151 may display execution screen information of an application program executing at the watch-type mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the watch-type mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the watch-type mobile terminal 100.

An optical output module 154 can output a signal for indicating an event generation using light of a light source. Examples of events generated in the watch-type mobile terminal 100 may include message reception, call signal reception, a missed call, an alarm, a schedule notice, an email reception, information reception through an application, and the like.

A signal output by the optical output module 154 may be implemented in such a manner that the watch-type mobile terminal emits monochromatic light or light with a plurality of colors. The signal output may be terminated as the watch-type mobile terminal senses that a user has checked the generated event, for example.

The interface unit 160 serves as an interface for external devices to be connected with the watch-type mobile terminal 100. For example, the interface unit 160 can receive data transmitted from an external device, receive power to transfer to elements and components within the watch-type mobile terminal 100, or transmit internal data of the watch-type mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the watch-type mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the watch-type mobile terminal 100 is connected with an external cradle, the interface unit 160 can serve as a passage to allow power from the cradle to be supplied to the watch-type mobile terminal 100 or may serve as a passage to allow various command signals input by the user from the cradle to be transferred to the watch-type mobile terminal there through. Various command signals or power input from the cradle may operate as signals for recognizing that the watch-type mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The watch-type mobile terminal 100 may also be operated in relation to a network storage device that performs the storage function of the memory 170 over a network, such as the Internet.

The controller 180 may typically control the general operations of the watch-type mobile terminal 100. For example, the controller 180 may set or release a lock state for restricting a user from inputting a control command with respect to applications when a status of the watch-type mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the watch-type mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Next, a communication system which may be implemented through the watch-type mobile terminal 100 according to the present disclosure will be described.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the watch-type mobile terminals 100 operating within the system. The broadcast receiving module 111 of FIG. 1 is typically configured inside the watch-type mobile terminal 100 to receive broadcast signals transmitted by the BT.

Global Positioning System (GPS) satellites for locating the position of the watch-type mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the watch-type mobile terminal. As an example, the location information module 115 may include a Global Position System (GPS) module, a Wi-Fi module, or both. If desired, the location information module 115 may alternatively or additionally function with any of the other modules of the wireless communication unit no to obtain data related to the position of the watch-type mobile terminal.

A typical GPS module 115 can measure an accurate time and distance from three or more satellites, and accurately calculate a current location of the watch-type mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the watch-type mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the watch-type mobile terminal 100. This technology typically includes the use of a Wi-Fi module in the watch-type mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the watch-type mobile terminal 100, based on the location information request message (or signal) of the watch-type mobile terminal 100. The information of the wireless AP may be transmitted to the Wi-Fi location determination server through the watch-type mobile terminal 100, or may be transmitted to the Wi-Fi location determination server from the wireless AP.

The information of the wireless AP extracted based on the location information request message of the watch-type mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the watch-type mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the watch-type mobile terminal 100 using at least one wireless AP information extracted from the database.

A method for extracting (analyzing) location information of the watch-type mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the watch-type mobile terminal 100 through the Wi-Fi location determination server, thereby acquiring location information of the watch-type mobile terminal 100.

The watch-type mobile terminal 100 can acquire location information by being connected to at least one wireless AP. The number of wireless APs required to acquire location information of the watch-type mobile terminal 100 may be variously changed according to a wireless communication environment within which the watch-type mobile terminal 100 is positioned.

Various embodiments described herein may be implemented in a computer-readable medium, a machine-readable medium, or similar medium using, for example, software, hardware, or any combination thereof.

Figure 2:
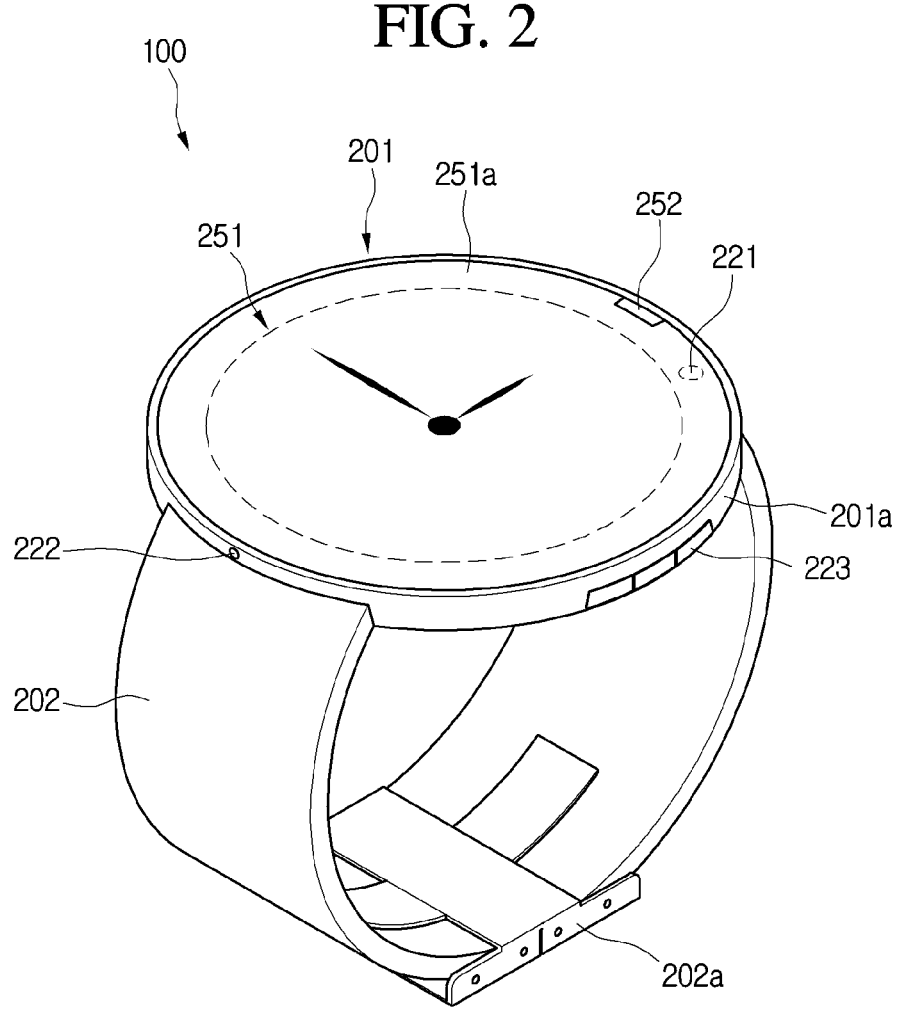
FIG. 2 is a perspective view showing an embodiment of the watch-type mobile terminal shown in FIG. 1.

FIG. 2 is a perspective view showing an embodiment of the watch-type mobile terminal shown in FIG. 1.

Although the display unit (or the touchscreen) 251 of the watch-type mobile terminal shown in FIG. 2 has a circular shape, the present disclosure is not limited thereto and the display unit may have an elliptical shape or a rectangular shape. The display unit 251 of the present disclosure may have a shape for providing a visually superior image to a user and capable of aiding the user in manipulating the display unit 251.

As illustrated in FIG. 2, the watch-type mobile terminal 100 includes a main body 201 with a display unit 251 and a band 202 connected to the main body 201 to be wearable on a wrist. In general, watch-type mobile terminal 100 may be configured to include features that are the same or similar to that of watch-type mobile terminal 100 of FIG. 1.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 100 with a uni-body.

The watch-type mobile terminal 100 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

Although the buttons provided at the side surface of the watch-type mobile terminal 100 are shown as the embodiment of the user input unit 223 in FIG. 2, the user input unit 223 is not limited thereto and may be implemented by the crown of a watch, a rotational bezel, etc.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 302a is implemented using a buckle.

Figure 3:
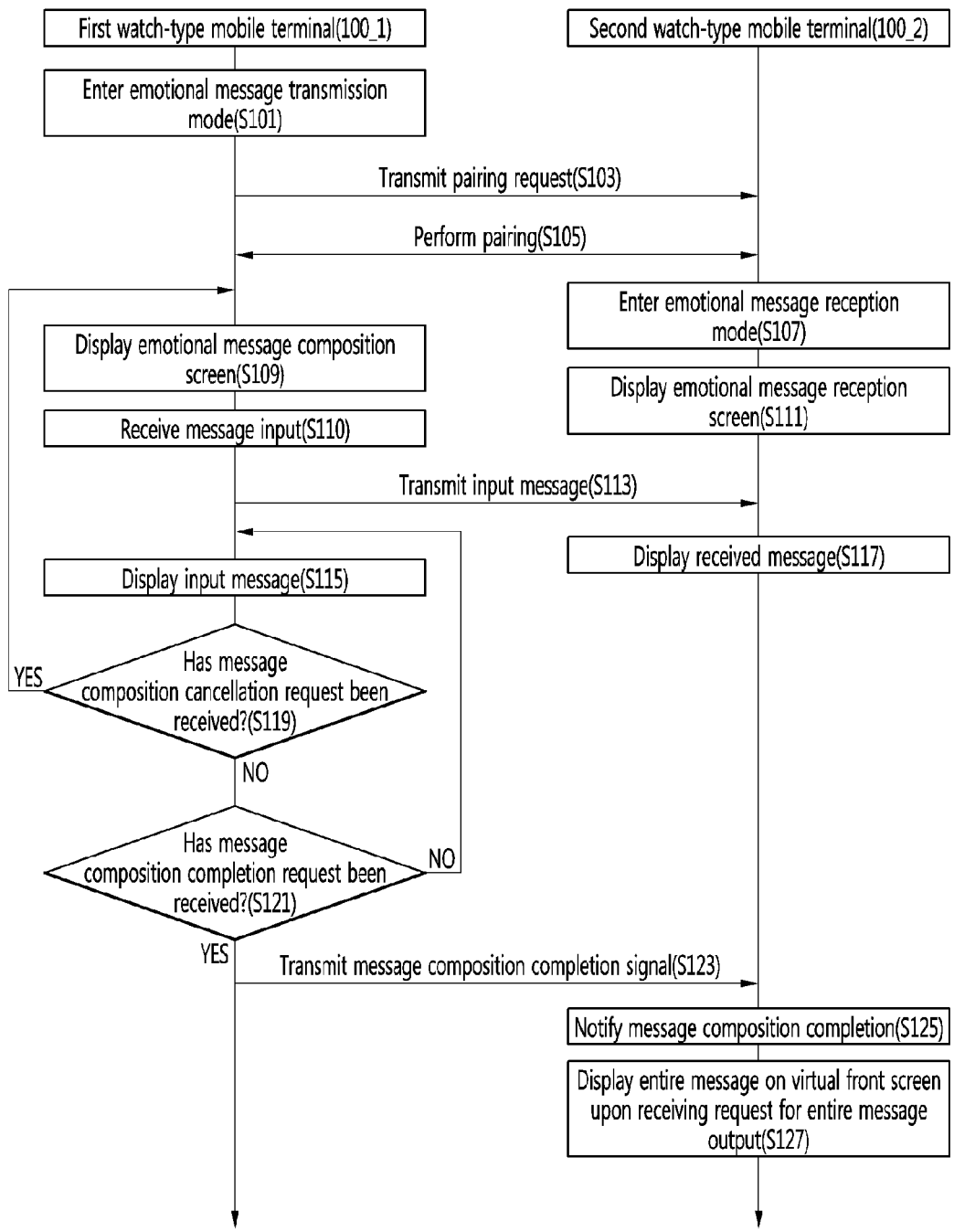
FIG. 3 is a flowchart illustrating a method of operating a watch-type mobile terminal according to one embodiment of the present disclosure.

FIG. 3 is a flowchart illustrating a method of operating a watch-type mobile terminal according to one embodiment of the present disclosure.

First, a controller 180 of a first watch-type mobile terminal 100_1 enables the first watch-type mobile terminal 100_1 to enter an emotional message composition mode in response to a request to enter the emotional message composition mode (S101). In one embodiment, in an emotional message transmitting mode, a message input to the first watch-type mobile terminal 100_1 as processed to have an emotional effect is transmitted in real time to a second watch-type mobile terminal 100_2. When the first watch-type mobile terminal 100_1 enters the emotional message mode, a watch-type mobile terminal 100 of a user selected among a pre-registered user or pre-registered users into the first watch-type mobile terminal 100_1 enters an emotional message receiving mode. This will be described later.

In one embodiment, the emotional message transmitting mode may be entered upon execution of an emotional message application installed in the first watch-type mobile terminal 100_1. That is, the controller 180, in response to receiving a request to execute the emotional message application, enables the first watch-type mobile terminal 100_1 to enter the emotional message composition mode.

The controller 180 of the first watch-type mobile terminal 100_1 transmits a pairing request to the second watch-type mobile terminal 100_2 via the wireless communication unit 110 after the first watch-type mobile terminal 100_1 enters the emotional message composition mode (S103). In one embodiment, the controller 180 may transmit the pairing request to the second watch-type mobile terminal 100_2 via the mobile communication module 112 or the short-range communication module 114 provided in the wireless communication unit 110. The pairing request may be a request of the second watch-type mobile terminal 100_2 to connect to the first watch-type mobile terminal 100_1 so that the second watch-type mobile terminal 100_2 may receive the emotional message in real time via wireless communication.

Pairing between the first watch-type mobile terminal 100_1 and the second watch-type mobile terminal 100_2 is performed (S105). Thereafter, the controller 180 of the second watch-type mobile terminal 100_2 enables the second watch-type mobile terminal 100_2 to enter the emotional message receiving mode (S107). That is, the second watch-type mobile terminal 100_2 may perform pairing with the first watch-type mobile terminal 100_1 in response to the received pairing request. The second watch-type mobile terminal 100 may automatically enter the emotional message receiving mode after the pairing has been established.

In one embodiment, in the emotional message receiving mode, the second watch-type mobile terminal 100 may receive, in real time, messages processed to have emotional effects from the first watch-type mobile terminal 100_1. When the first watch-type mobile terminal 100_1 enters the emotional message transmitting mode, the second watch-type mobile terminal 100_2 may automatically enter the emotional message receiving mode. According to another embodiment of the present disclosure, when the second watch-type mobile terminal 100_2 enters the emotional message transmitting mode, the first watch-type mobile terminal 100_1 may automatically enter the emotional message receiving mode.

The emotional message application may be installed in the second watch-type mobile terminal 100_1. In response to the second watch-type mobile terminal 100_1 pairing with the first watch-type mobile terminal 100_1, the emotional message application may be automatically executed.

The controller 180 of the first watch-type mobile terminal 100_1 enables an emotional message composition screen to be displayed on a display unit 151 of the first watch-type mobile terminal 100_1 in response to the first watch-type mobile terminal 100_1 entering the emotional message transmitting mode (S109). In response to the second watch-type mobile terminal 100_2 entering the emotional message receiving mode, the controller 180 of the second watch-type mobile terminal 100_2 enables an emotional message receiving screen to be displayed on a display unit 151 of the second watch-type mobile terminal 100_2 (S111).

Operation S109 will be described with reference to FIGS. 4 to 6.

Figure 4:
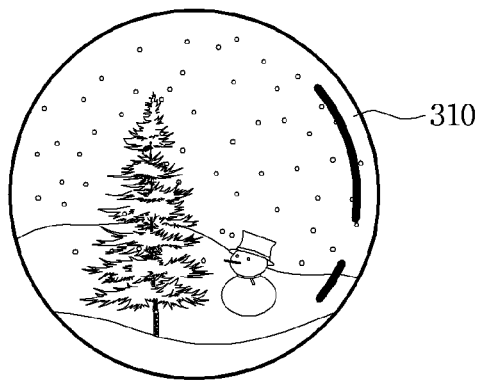
FIG. 4 illustrates an embodiment of a screen being displayed in response to the first watch-type mobile terminal entering the emotional message transmitting mode.

FIG. 4 illustrates an embodiment of a screen being displayed in response to the first watch-type mobile terminal entering the emotional message transmitting mode. FIGS. 5 to 6 illustrate embodiments of a screen being displayed in response to the second watch-type mobile terminal entering the emotional message receiving mode.

First, FIG. 4 will be described.

Referring to FIG. 4, upon the first watch-type mobile terminal 100_1 entering the emotional message transmitting mode, the first watch-type mobile terminal 100_1 displays the emotional message composition screen 300 on its display unit 151. In one embodiment, the controller 180 may control the display unit 151 such that the emotional message composition screen 300 exhibits a snowball effect. The snowball effect may be similar to an effect realized using a fisheye lens with a 180 degree view angle. That is, the snowball effect causes the emotional message composition screen 300 on the display unit 151 to be displayed three-dimensionally so that a focal length thereof is extremely short and the screen is distorted in a rounded manner. In this way, when the first watch-type mobile terminal 100_1 enters the emotional message transmitting mode, the user may feel that the emotional message composition screen 300 visually protrudes from the screen.

The emotional message composition screen 300 may display therein a background image 310 for composition of the emotional message. The background image may be an image set in response to a user's request, or an image set by default.

Next, FIG. 5 will be described.

Figure 5:
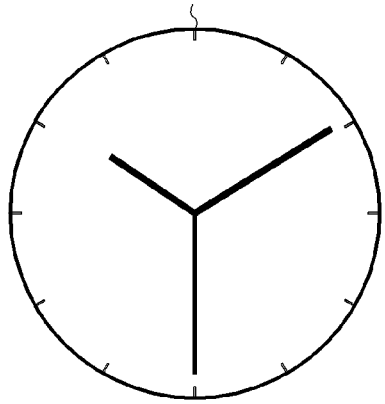
FIG. 5 to FIG. 6 illustrate embodiments of a screen being displayed in response to the second watch-type mobile terminal entering the emotional message receiving mode.
Figure 5:
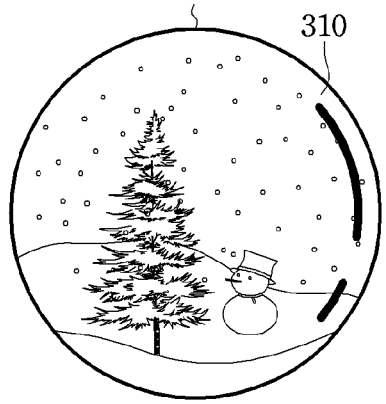

FIG. 5 illustrates an emotional message receiving screen 500 displayed on a display unit 151 in response to the second watch-type mobile terminal 100_2 entering an emotional message receiving mode, in accordance with one embodiment of the present disclosure. The controller 180 of the second watch-type mobile terminal 100_2 allows the second watch-type mobile terminal 100_2 to enter the emotional message receiving mode after the second watch-type mobile terminal 100_2 has been paired with the first watch-type mobile terminal 100_1. The controller 180 of the second watch-type mobile terminal 100_2 controls the display unit 151 to display the emotional message receiving screen 500 thereon. For example, first, the second watch-type mobile terminal 100_2 displays a simple clock screen 400 as shown in FIG. 5a, and, then, upon entering the emotional message receiving mode, the second watch-type mobile terminal 100_2 displays an emotional message receiving screen 500 as shown in FIG. 5b. The emotional message receiving screen 500 may have a snowball effect. Further, the controller 180 of the second watch-type mobile terminal 100_2 may control the display unit 151 of the second watch-type mobile terminal 100_2 to display thereon a background image 310 contained in the emotional message composition screen 300 of the first watch-type mobile terminal 100_1. The background image 310 included in the emotional message receiving screen 500 may be received with being contained in the pairing request received from the first watch-type mobile terminal 100_1.

According to another embodiment of the present disclosure, first, the second watch-type mobile terminal 100_2 does not display any screen, and then, upon entering the emotional message receiving mode, the second watch-type mobile terminal 100_2 displays the simple clock screen 400 shown in FIG. 5a, and the emotional message receiving screen 500 shown in FIG. 5b in this sequence.

The emotional message composition screen 300 and the emotional message receiving screen 500 according to an embodiment of the present disclosure may be named as a snowball screen.

Next, FIG. 6 will be described.

Figure 6:
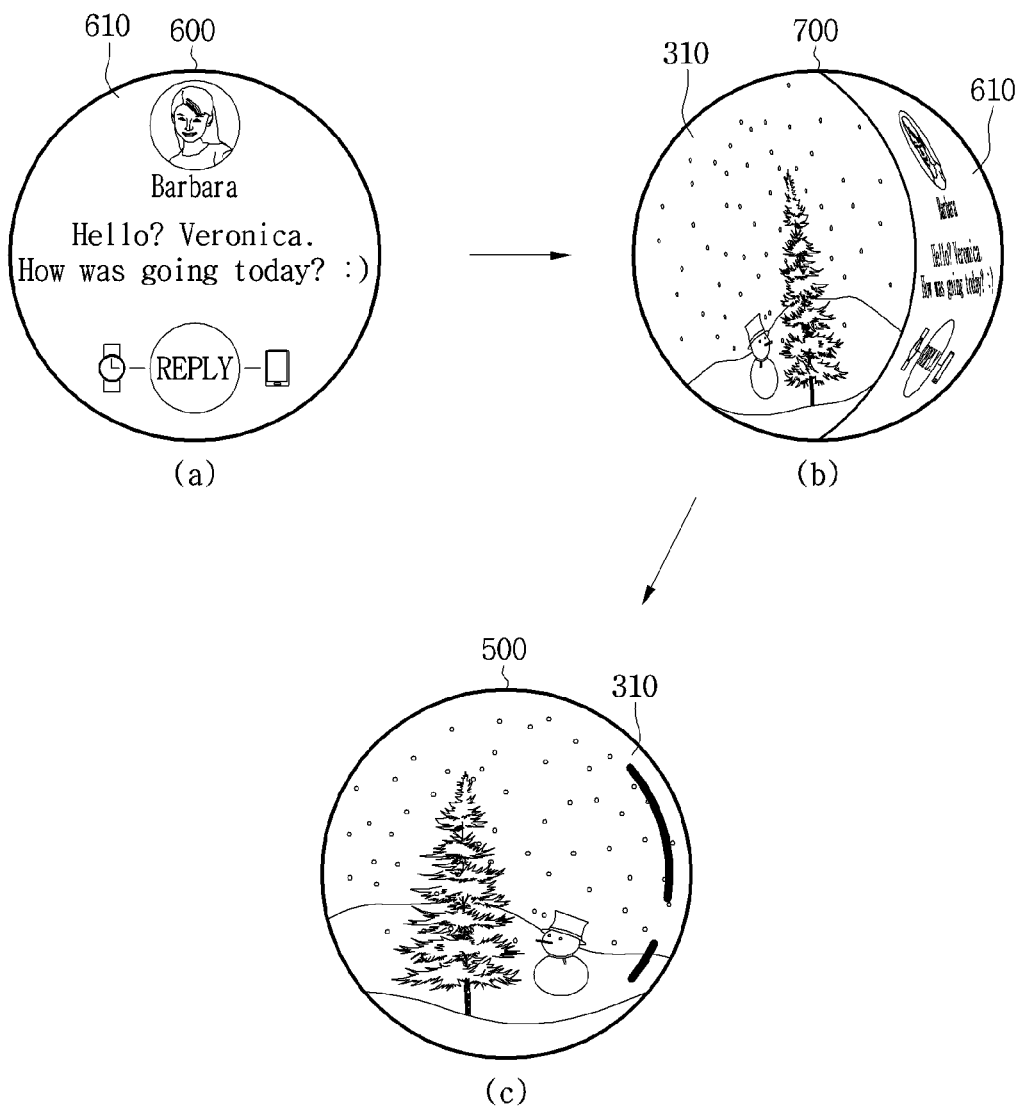

FIG. 6 illustrates another embodiment of an emotional message receiving screen 500 displayed on the display unit 151 in response to the second watch-type mobile terminal 100_2 entering the emotional message receiving mode.

The controller 180 of the second watch-type mobile terminal 100_2 allows the second watch-type mobile terminal 100_2 to enter the emotional message receiving mode after the second watch-type mobile terminal 100_2 has been paired with the first watch-type mobile terminal 100_1. The controller 180 of the second watch-type mobile terminal 100_2 controls the display unit 151 to display the emotional message receiving screen 500 thereon. For example, first, the second watch-type mobile terminal 100_2 displays an executed screen 600 of a message application as shown in FIG. 6a, and, then, upon entering the emotional message receiving mode, the controller 180 of the second watch-type mobile terminal 100_2 may control the display unit 151 to display a emotional message switching screen 700. In this connection, the emotional message switching screen 700 may be a screen illustrating a process of switching from the executed screen 600 of the typical message application to the emotional message receiving screen 500. That is, the emotional message switching screen 700 may include a portion of a message window 610 included in the conventional message application screen 600, and a portion of the background image 310 included in the emotional message receiving screen 500. The controller 180 of the second watch-type mobile terminal 100_2 may control the display unit 151 such that the emotional message switching screen 700 exhibits a snowball effect.

Then, after the emotional message switching screen 700 is displayed, the controller 180 of the second watch-type mobile terminal 100_2 may control the display unit 151 to display the emotional message receiving screen 500.

Again, FIG. 3 will be described.

The controller 180 of the first watch-type mobile terminal 100_1 enables the first watch-type mobile terminal 100_1 to receive message input (Silo). Then, the controller 180 of the first watch-type mobile terminal 100_1 enables the first watch-type mobile terminal 100_1 to transmit the input message to the wireless communication unit 111 of the second watch-type mobile terminal 100_2 via the wireless communication unit 110 (S1113).

In one embodiment, the controller 180 of the first watch-type mobile terminal 100_1 enable the first watch-type mobile terminal 100_1 to receive the message through touch input of the user.

The controller 180 of the first watch-type mobile terminal 100_2 controls the display unit 151 thereof to display the received message input (S115). The controller 180 of the second watch-type mobile terminal 100 controls the display unit 151 of the second watch-type mobile terminal 100 to display the message received from the first watch-type mobile terminal 100_1 (S117). The display unit of the first watch-type mobile terminal 100_1 may display the input message in real time in the emotional message composition screen 300. The display unit of the second watch-type mobile terminal 100_2 may display the message received from the first watch-type mobile terminal 100_1 in real time in the emotional message receiving screen 500.

Operations S115 to S117 will be described later in detail with reference to the following drawing.

Figure 7:
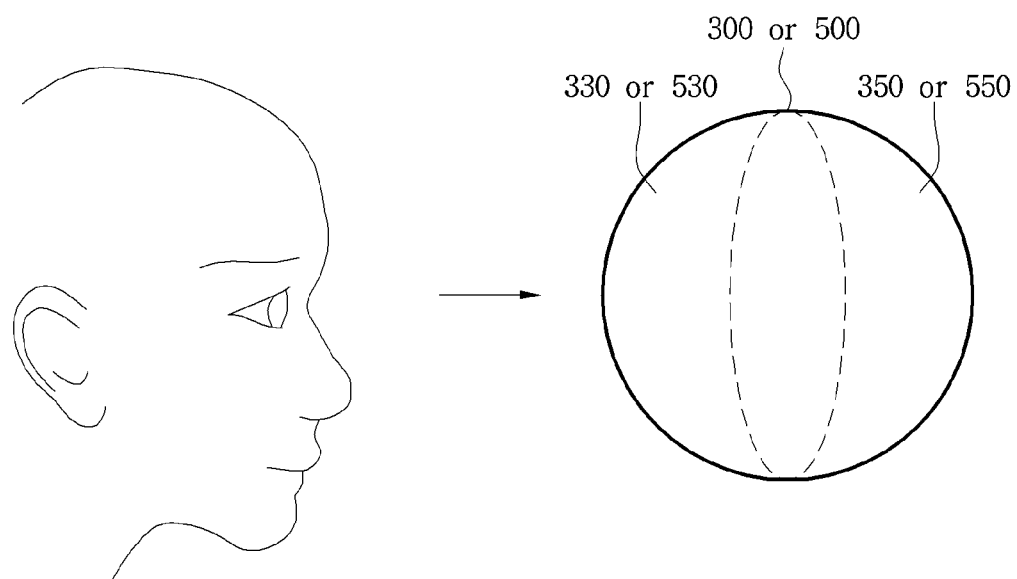
FIG. 7 illustrates a screen displayed on a display unit, having a snowball effect, according to one embodiment of the present disclosure.

FIG. 7 illustrates a screen displayed on a display unit, having a snowball effect, according to one embodiment of the present disclosure.

In this connection, the screen displayed on the display unit 151 having the snowball effect may be either the emotional message composition screen 300 or the emotional message receiving screen 500.

Hereinafter, the emotional message composition screen 300 and the emotional message receiving screen 500 may have 3D effect. Details thereof will be described later.

In FIG. 7, the emotional message composition screen 300 is illustrated by way of example.

The emotional message composition screen 300 may include a virtual front face 330 and a virtual rear face 350. The virtual front face 330 may be a screen in which a message input from the first watch-type mobile terminal 100_1 transmitting the message is displayed. The virtual rear face 350 may be a screen in which the input message received by the second watch-type mobile terminal 100_2 receiving the message is displayed in real time. The virtual front face 330 may be a face located closer to the user's eyes. The virtual rear face 350 may be located more distantly from the user's eyes than the virtual front face 350.

The virtual front face 300 and the virtual rear face 350 may be virtual screens introduced for the convenience of explanation when the screen on the display unit 151 exhibits the snowball effect. Likewise, the emotional message receiving screen 500 may also include a virtual front face 530 and a virtual rear face 550.

Next, with reference to FIG. 8 and FIG. 9, and, based on details as described with reference to FIG. 7, the emotional message composition screen 300 and the emotional message receiving screen 500 are described.

Figure 8:
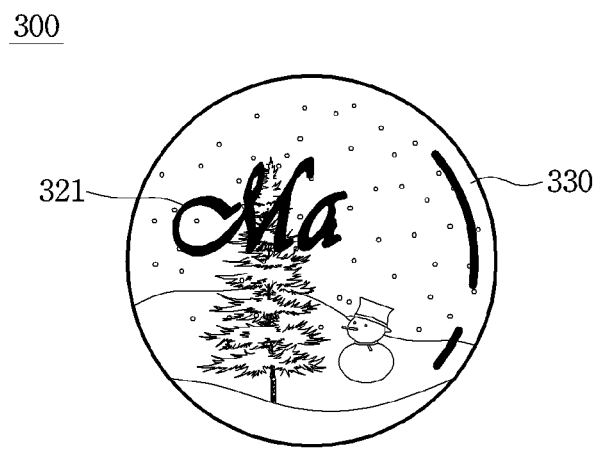
FIG. 8 illustrates an emotional message composition screen that displays an input message according to one embodiment of the present disclosure.
Figure 9:
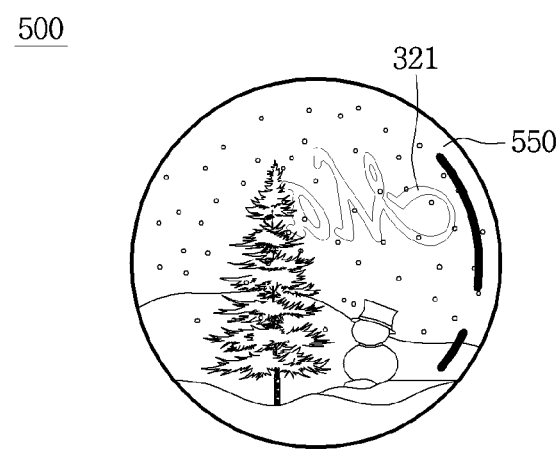
FIG. 9 illustrates an emotional message receiving screen displaying the received message.

FIG. 8 illustrates an emotional message composition screen that displays an input message according to one embodiment of the present disclosure. FIG. 9 illustrates an emotional message receiving screen displaying the received message.

Referring to FIG. 8, the controller 180 of the first watch-type mobile terminal 100_1 may control the display unit 151 to display the message 321 input via the touch input in the virtual front face 330 of the emotional message composition screen 300 thereon. In this connection, the controller 180 of the second watch-type mobile terminal 100_2 paired with the first watch-type mobile terminal 100_1 may control the second watch-type mobile terminal 100_2 to receive the message 321 in real time. The controller 180 of the second watch-type mobile terminal 100_2 may control the display unit 151 to display the received message 321 in the virtual rear face 550 of the emotional message receiving screen 500 thereon. The controller 180 of the second watch-type mobile terminal 100_2 may control the display unit 151 to display the received message 321 in a dimmed manner in the virtual rear face 550 of the emotional message receiving screen 500 thereon. The user of the second watch-type mobile terminal 100_2 may feel in real time that the message composed by the user of the first mobile terminal dims. As a result, the user of the second watch-type mobile terminal 100_2 may receive directly the emotion felt by the user of the first mobile terminal when the user of the first mobile terminal composes the corresponding message.

That is, the user of the first watch-type mobile terminal 100_1 and the user of the second watch-type mobile terminal 100_2 may feel that they are facing each other with the actual round snowball therebetween.

Again, FIG. 3 will be described.

The controller 180 of the first watch-type mobile terminal 100_1 determines whether a message composition cancel request is received (S119). If the message composition cancel request is received, the method returns to operation S109, where the controller 180 of the first watch-type mobile terminal 100_1 controls the display unit 151 to display the emotional message composition screen (S109). In one embodiment, the message composition cancel request may be a flicking input received on the emotional message composition screen 300.

In one embodiment, the controller 180 of the first watch-type mobile terminal 100_1 may delete the message displayed on the message composition screen 300, in response to receiving of the message composition cancel request. This will be described with reference to FIG. 10.

Figure 10:
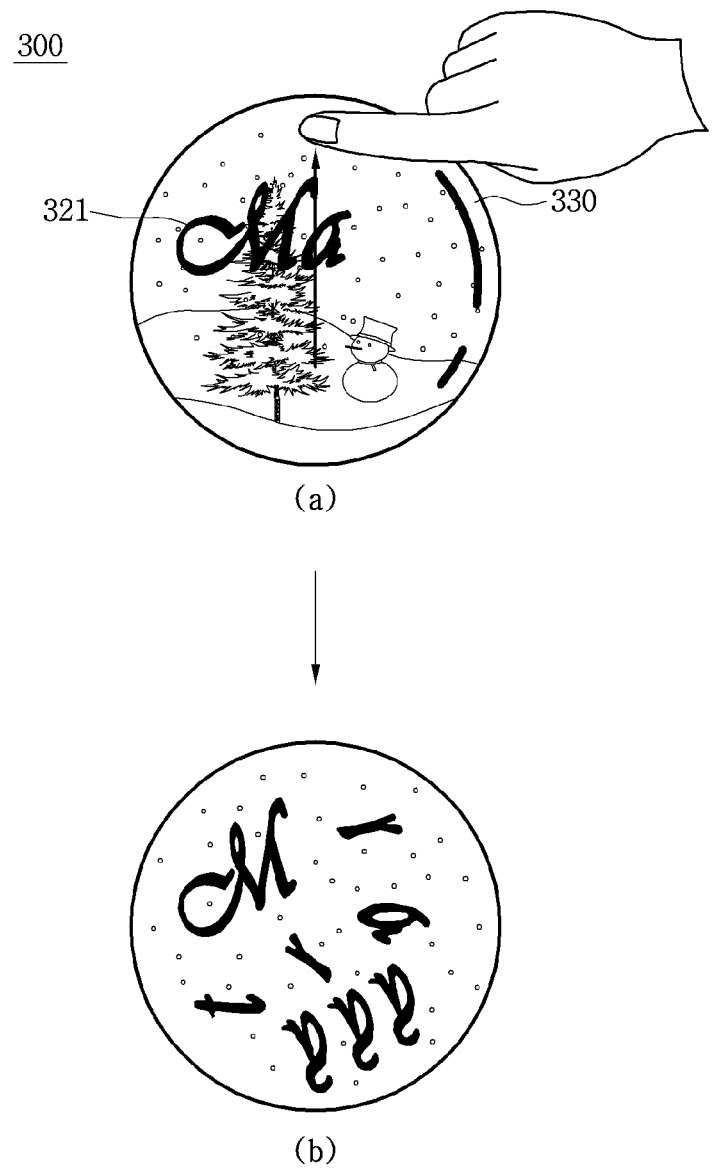
FIG. 10 illustrates a process of deleting a message displayed on an emotional message composition screen according to one embodiment of the present disclosure.

FIG. 10 illustrates a process of deleting a message displayed on an emotional message composition screen according to one embodiment of the present disclosure.

Referring to FIG. 10*a*, a message 321 is displayed in the virtual front face 330 of the emotional message composition screen 300. When, in this state, a flicking input corresponding to the message composition cancel request is received, the controller 180 of the first watch-type mobile terminal 100_1 may delete the displayed message 321. The flicking input may be act to move a touch point from one point located in a lower region of the emotional message composition screen 300 to another point located in an upper region of the emotional message composition screen 300. However, the present disclosure is not limited to this. That is, the flicking input may act to move the touch point from one point located in the upper region of the emotional message composition screen 300 to another point located in the lower region of the emotional message composition screen 300. In response to receiving this flicking input, the message 321 may be deleted. In response to receipt of the message composition cancel request, the controller 180 may control the display unit 151 so that characters included in the message 321 disappear with the same effect as if snows are blown, as shown in FIG. 10B.

Again, FIG. 3 will be described.

The controller 180 of the first watch-type mobile terminal 100_1 determines whether a message composition completion request is received (S121). When the message composition completion request is received, the controller 180 of the first watch-type mobile terminal boo transmits a message composition completion signal to the second watch-type mobile terminal 100_2 (S123). In one embodiment, the message composition completion request may be a flicking input received on the emotional message composition screen 300.

In yet another embodiment, the message composition completion request may be received via an input to the user input unit 223, as shown in FIG. 2.

Hereinafter, operations S121 to S123 will be described.

Figure 11:
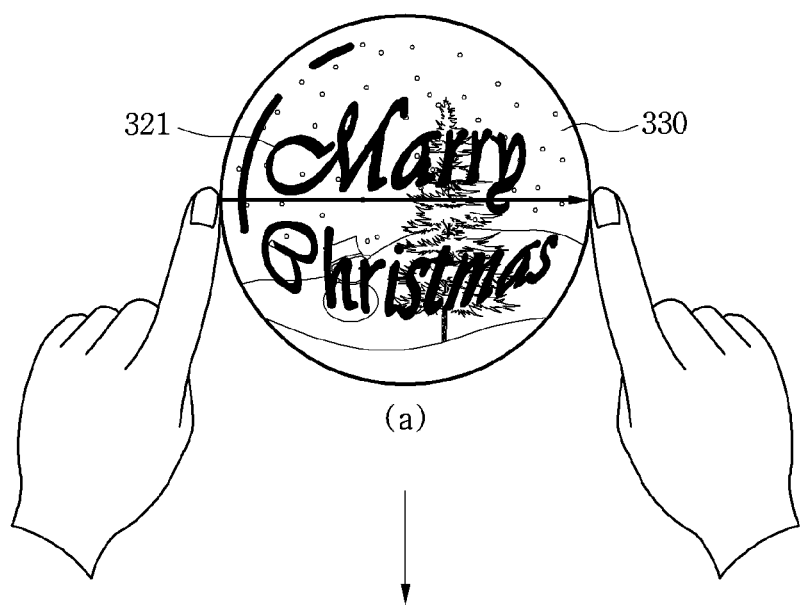
FIG. 11 to FIG. 12 illustrate a process of receiving a message composition completion request according to one embodiment of the present disclosure.
Figure 11:
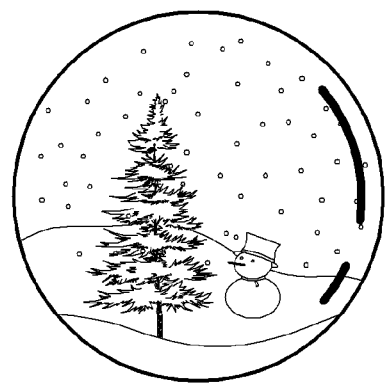
Figure 12:
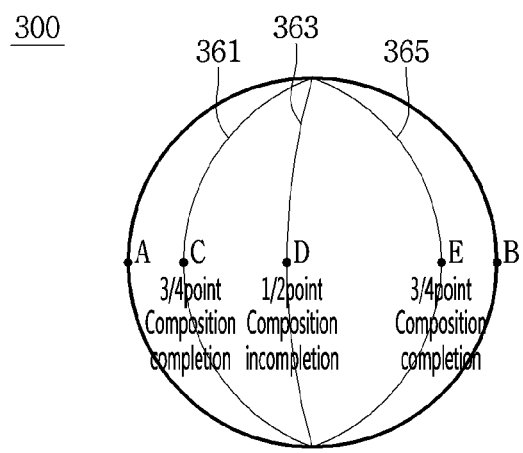

FIG. 11 to FIG. 12 illustrate a process of receiving a message composition completion request according to one embodiment of the present disclosure.

First, referring to FIG. 11*a*, a message 323 is displayed on the virtual front face 330 of the emotional message composition screen 300. In this state, the controller 180 may receive a touch input at one point on the emotional message composition screen 300. The controller 180 may recognize a flicking input for moving the received touch input to a right side of the emotional message composition screen 300 as a message composition completion request. In this connection, left and right sides may be reversed. The controller 180 controls the display unit 151 in response to receiving the flicking input so that the message 323 displayed on the emotional message composition screen 300 disappears as shown in FIG. 11*b*. At the same time, the controller 180 may send the message composition completion signal to the second watch-type mobile terminal 100_2 in response to receiving the flicking input.

In one embodiment, the controller 180 may determine whether the message composition completion request has been received, based on a distance corresponding to the flicking input. With reference to FIG. 12, this will be described.

Referring to FIG. 12, on the emotional message composition screen 300, a first point A, a second point B, a third point C, a fourth point D and a fifth point E are located. Further, on the emotional message composition screen 300, a first virtual line 361, a second virtual line 363, and a third virtual line 365 are shown. Each virtual line may be a line generated on a sphere, assuming that the snowball is the sphere when the emotional message composition screen 300 exhibits the snowball effect.

Assuming that the emotional message composition screen 300 is circular, the first point A and the second point B may be located on this circle. The third point C is located on the first virtual line 361. The fourth point D is located on the second virtual line 363. The fifth point E is located on the third virtual line 365.

The controller 180 receives the touch input at the first point A. If the received touch input is moved to the second point B or the fifth point E, the controller 180 may recognize a corresponding flicking input as a message composition completion request. In response, the controller 180 may send a message composition completion signal to the second watch-type mobile terminal 100_2.

If the touch input at the first point A is received, and, then, the received touch input is moved to the third point C or the fourth point D, the controller 180 recognizes the corresponding flicking input as a situation where the message composition is incomplete. In response, the controller 180 may not send the message composition completion signal to the second watch-type mobile terminal 100_2.

In one embodiment, when the user grabs and rotates the snowball, this action may indicate that the composition of the message has been completed.

Again, FIG. 3 will be described.

The controller 180 of the second watch-type mobile terminal 100_2 outputs a message composition completion notification informing message composition completion, based on receiving of message composition completion signal (S125). In one embodiment, the message composition completion notification may be output in a vibration form via a haptic module provided in the second watch-type mobile terminal 100_2.

In another embodiment, the message composition completion notification may be output via a separate message indicating message composition completion on the display unit 151.

In yet another embodiment, the message composition completion notification may be output via the audio output module 252.

Then, in operation S127, the controller 180 of the second watch-type mobile terminal 100_2 controls the display unit 151 to display an entire message on the virtual front face 550 of the display unit 151, in response to receiving an entire message output request. In one embodiment, the entire message output request may be a flicking input that functions to display the virtual rear face 550 on the emotional message receiving screen 500. This will be described with reference to the following drawing.

Figure 13:
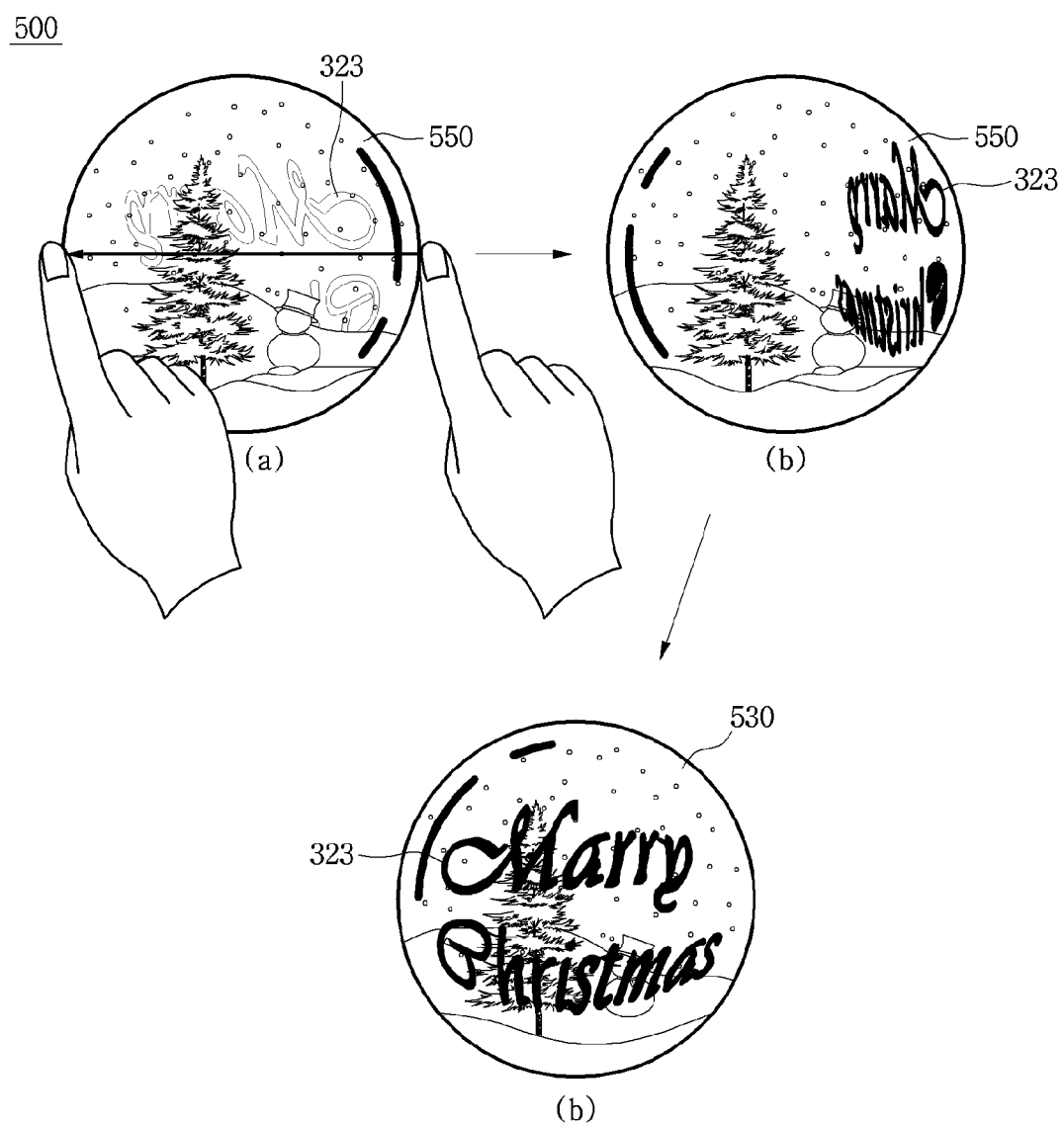
FIG. 13 illustrates a process of receiving an entire message output request by a second watch-type mobile terminal according to one embodiment of the present disclosure.

FIG. 13 illustrates a process of receiving an entire message output request by a second watch-type mobile terminal according to one embodiment of the present disclosure.

FIG. 13*a* illustrates an emotional message receiving screen 500 after the second watch-type mobile terminal 100_2 receives a message composition completion signal from the first watch-type mobile terminal 100_1. In the virtual rear face 550 of the emotional message receiving screen 500, a message 323 received from the first watch-type mobile terminal 100_1 may be displayed. The message 323 displayed on the virtual rear face 550 may correspond to an upside-down state of the message 321 displayed on the virtual front face 330 of the emotional message composition screen 300, as shown at FIG. 11a. Since the emotional message receiving screen 500 has a snowball effect, the message 323 displayed on the virtual rear face 550 may be displayed in a visually-distorted manner. In a respond to receiving of a flicking input functioning to move a touch input at one point on the emotional message receiving screen 500 to the left, the controller 180 of the second watch-type mobile terminal 100_2 may switch the screen as shown in FIG. 13a to a screen as shown in FIG. 13b and then a screen as shown in FIG. 13c sequentially.

FIG. 13b is a view showing a process of moving the message 323 arranged on the virtual rear face 550 of the emotional message receiving screen 500 so that the snow ball may be rotated. Further, FIG. 13c shows a state in which the message 323 has been displayed on the virtual front face 530 of the emotional message receiving screen 500 in response to the flicking input.

According to an embodiment of the present disclosure, the screen of the two-dimensional display unit 151 has a three-dimensional effect such as a snowball, so that two users may feel as if they are facing each other with the snowball between them.

According to another embodiment of the present disclosure, physical information about a user measured at the watch-type mobile terminal 100 may be transmitted to another mobile terminal. Thus, the other party of another mobile terminal receives the physical information emotionally. This will be described with reference to the following drawings.

Figure 14:
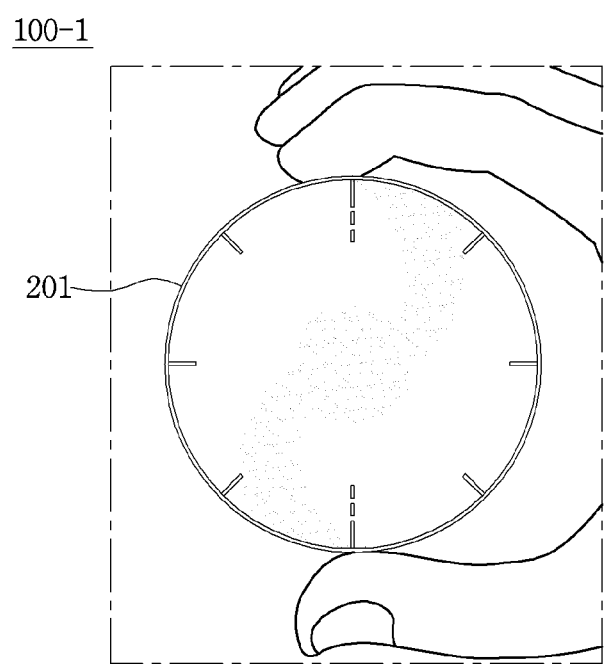
FIG. 14 to FIG. 15 illustrates a process of transmitting a user's heart rate by a first user and emotionally recognizing such heart rate by a second user, according to one embodiment of the present disclosure.
Figure 15:
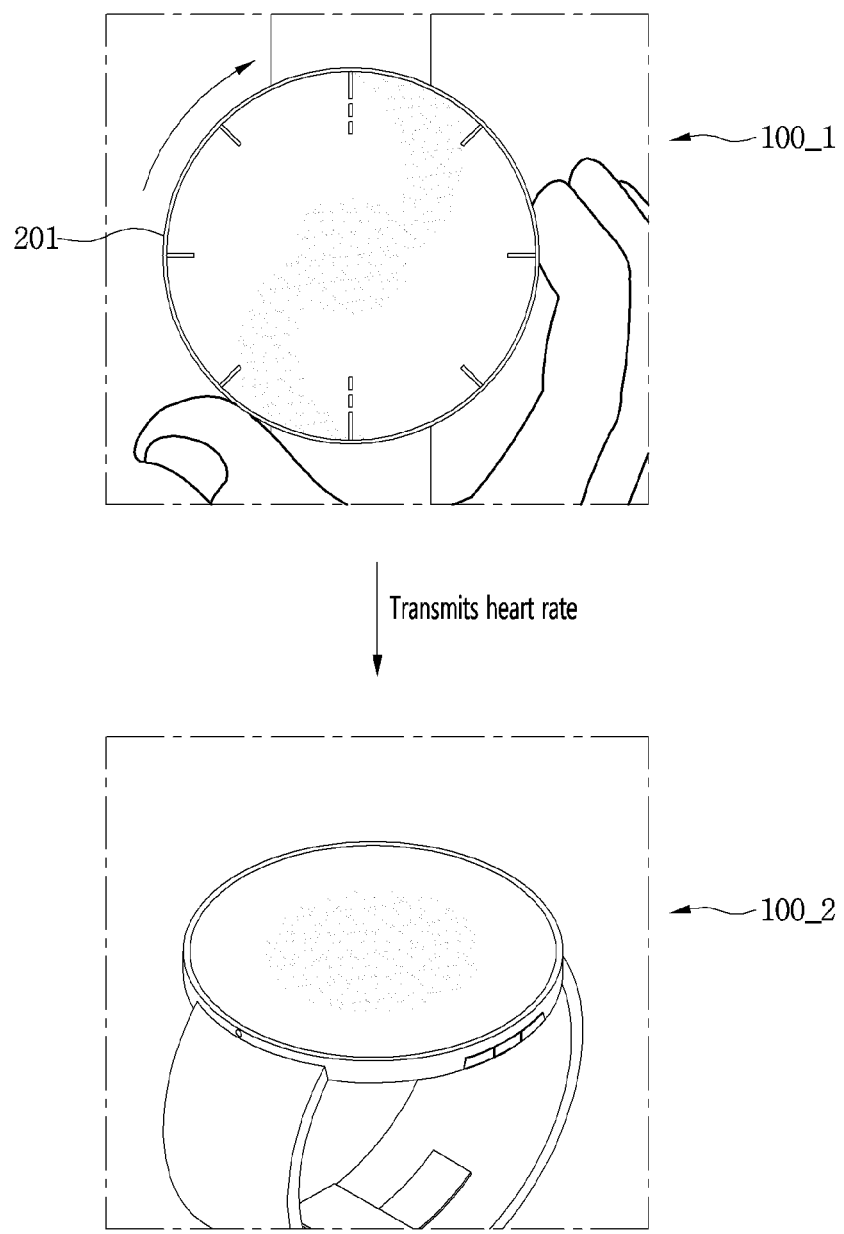

FIG. 14 to FIG. 15 illustrates a process of transmitting a user's heart rate by a first user and emotionally recognizing such heart rate by a second user, according to one embodiment of the present disclosure.

Referring to FIG. 14, a body 201 of the first watch-type mobile terminal 100_1 may include two heart rate sensors. Here, the number of the two sensors is merely an example. If the first user holds two points on the body 201, the two heart rate sensors may measure the heart rate of the first user. At the same time, the display unit 251 of the body 201 may display information on the measured heart rate. The first watch-type mobile terminal 100_1 may control a haptic module included in a band 202 on a wrist of the first user to output vibration corresponding to the measured heart rate.

Thereafter, as shown in FIG. 15, when the first watch-type mobile terminal 100_1 receives a signal corresponding to an operation of rotating its body by more than a predetermined angle, the first watch-type mobile terminal 100_1 transmits the measured heart rate to the second watch-type mobile terminal 100_2. The second watch-type mobile terminal 100_2 may display the received heart rate on the display unit 251 and may output a vibration corresponding to the heart rate. The second watch-type mobile terminal 100_2 may control a haptic module included in a second band 202 worn on a wrist of the second user of the second watch-type mobile terminal 100_2 so as to output the vibration corresponding to the heart rate.

In the above-described embodiment of the present disclosure, the heart rate is introduced by way of example, but the present disclosure is not limited thereto. The transmitted physical information may include the body temperature of the user.

The present disclosure mentioned in the foregoing description may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller 180 of the terminal. Accordingly, the detailed description is intended to be illustrative, and not to limit the scope of the claims. The scope of the present disclosure should be determined by the appended claims and their legal equivalents, not by the above description, and all changes coming within the meaning and equivalency range of the appended claims are intended to be embraced therein.

What is claimed is:

1. A watch-type mobile terminal comprising:
a display unit; and
a controller operably coupled to the display unit,
wherein the controller is configured:
in response to being paired with a further watch-type mobile terminal, to display an emotional message composition screen;
to receive a message via touch input;
to display the received message on the emotional message composition screen;
to transmit the message to the further watch-type mobile terminal; and
to control the display unit such that the emotional message composition screen has a fisheye lens effect,
wherein the emotional message composition screen includes a virtual front face and a virtual rear face, and
wherein the controller is further configured to display the message in the virtual front face.

2. The terminal of claim 1, wherein the controller is further configured to delete the message in response to receiving a flicking input that functions to cancel composition of the message.

3. The terminal of claim 2, wherein the controller is further configured to delete the message in response to receiving the flicking input functioning to move up a touch input point on the emotional message composition screen.

4. The terminal of claim 1, wherein the controller is further configured to transmit a message composition completion signal to the further watch-type mobile terminal, in response to receiving a flicking input indicating a message composition completion request, wherein the message composition completion signal indicates that composition of the message has been completed.

5. The terminal of claim 4, wherein the controller is further configured to transmit the message composition completion signal to the further watch-type mobile terminal, in response to receiving a flicking input functioning to move a touch input point on the emotional message composition screen in a left or right direction.

6. The terminal of claim 5, wherein the transmission of the message composition completion signal to the further watch-type mobile terminal is triggered when a movement distance of the touch input point is equal to or greater than a predetermined distance.

7. A watch-type mobile terminal comprising:
a display unit; and
a controller operably coupled to the display unit,
wherein the controller is configured:
in response to being paired with a further watch-type mobile terminal, to display an emotional message receiving screen;
to receive a message from the further watch-type mobile terminal being paired;
to display the received message on the emotional message receiving screen; and
to control the display unit such that the emotional message composition screen has a fisheye lens effect,
wherein the emotional message composition screen includes a virtual front face and a virtual rear face, and
wherein the controller is further configured to display the message in the virtual front face.

8. The terminal of claim 7, wherein the controller is further configured:
to receive a message composition completion signal from the further watch-type mobile terminal, and
to output a message composition completion notification based on receiving of the message composition completion signal.

9. The terminal of claim 7, wherein the controller is further configured to display the received message on the virtual front face of the emotional message receiving screen, in response to receiving an entire message output request.

10. The terminal of claim 9, wherein the controller is further configured to display the received message on the virtual front face of the emotional message receiving screen, in response to receiving a flicking input functioning to move a touch input point on the emotional message receiving screen in a left or right direction.

11. The terminal of claim 7, wherein the controller is further configured to display an emotional message switching screen, in response to being paired with the further watch-type mobile terminal, wherein the emotional message switching screen contains a portion of a screen of a currently-executed application and a portion of the emotional message receiving screen.

12. The terminal of claim 7, wherein the controller is further configured to switch a screen of a currently-executed application to the emotional message receiving screen, in response to being paired with the further watch-type mobile terminal.

* * * * *